Patented Sept. 19, 1950

2,523,177

UNITED STATES PATENT OFFICE 2,523,177

ETHYLENE DIAMINE CONDENSATION PRODUCTS AND PARASITICIDAL COMPOSITIONS CONTAINING THEM

Howard L. Yowell and Louis A. Mikeska, Westfield, N. J., assignors to Standard Oil Development Company, a corporation of Delaware No Drawing. Application September 1, 1948, Serial No. 47,325

9 Claims. (Cl. 167—22)

1

This invention relates to new and useful improvements in parasiticidal preparations and more particularly to improved insecticides and fungicides. This invention also relates to methods of protecting organic material subject to attack by low orders of organisms. This invention further relates to the synthesis of new chemical compounds, namely, certain ethylene diamine condensation products.

It has now been found that certain ethylene diamine condensation products of this invention are extremely effective for destroying and checking the growth of fungi and insects. These compounds may be used as novel ingredients of seed and plant protectants because of their disinfecting action on soil containing harmful organisms.

These compounds which are believed to be new may also be applied to parent materials to retard or prevent fungus growth and mildew formation. Since most of these compounds are exceptionally nonphytotoxic they may be applied safely to a wide variety of plants. Some of the additional parent materials to which they may be applied for protective purposes are leather, wood, fur, wool, coated fabrics and other substances.

These new compounds which are gummy solids may be reduced to an impalpable powder and applied as a dust, preferably by mixing with a solid carrier, such as clay, talc and bentonite. They may also be applied as a spray in a liquid carrier, either as a solution in a solvent, or as a suspension in a non solvent, such as water. When applied as a spray in water, it may be desirable to incorporate wetting agents.

Among the solvents for the compounds of this invention are organic solvents such as ethers, alcohols, aromatic hydrocarbons (benzene, etc.), petroleum solvents, etc.

The water-soluble wetting agents that may be used comprise the sulfates of long chain alcohols such as dodecanol up to octadecanol, sulfonated amide and ester derivatives, sulfonated aromatic and mixed alkyl-aryl sulfonate derivatives, esters of fatty acids such as the ricinoleic acid ester of sorbitol, and petroleum sulfonates of $C_{10}$ to $C_{20}$ length. The non-ionic emulsifying agents such as the ethylene oxide condensation products of high molecular weight alcohols or of alkylated phenols may also be used. It is to be understood that these and similar compounds are intended when the term wetting agent is used hereafter.

The compounds of this invention may also be admixed with carriers that are themseves active such as parasiticides, hormones, herbicides, fertilizers and wetting agents, stomach and contact insecticides such as the arsenates, fluorides, rotenone and the various fish poisons and organic insecticides such as dichloro-diphenyl trichloroethane. Benzene-hexachloride and similar products may also be advantageously added.

By virtue of their solubility in the "Freons," i. e., $CCl_3F$, $CCl_2F_2$, $CClF_3$, $CHCl_2F$ etc., and other aerosol type solvents, the compounds of this invention are adapted for use in aerosol compositions for space spray and fumigation applications. When put up in this form they can be dispensed in the conventional pressure containers known in the art.

The compounds of this invention comprise hydrocarbon radicals containing 8 or more alkyl carbon atoms, which by an ether-type linkage are connected to groups that are obtained by condensing polyhydric derivatives of short-chain hydrocarbons having less than 4 carbon atoms with ethylene diamine. The general compositional formula of the compounds of this invention may be expressed as follows:

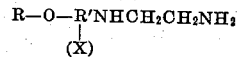

wherein R is a hydrocarbon radical having at least 8 alkyl carbon atoms, R' is an alkylene radical having from 2 to 3 carbon atoms and X is a radical selected from the group consisting of H and OH radicals.

The possibility of isomerism exists within the alkylene portion of the various specific compounds listed below, because the hydroxyl and ether linkages may vary within the alkylene radical, i. e., either may be in position 1 or 2. It should be borne in mind, therefore, that where these linkages are shown in the formulae that follow, that they represent the best available information as to the structure of the particular compounds, but it is specifically desired not to be limited by these linkages.

This invention will be better understood by reference to the following examples of the prepa-

EXAMPLE 1

N-(tertiaryoctylphenoxy-ethyl) ethylenediamine

A 3-way flask equipped with a stirrer, a return condenser and a thermometer, was charged with 53.7 gms. (0.2 mol) of tertiaryoctylphenoxy-ethyl chloride, and 12 gms. (0.2 mol) of anhydrous ethylene diamine. The mixture was then heated with stirring for 1 hour at 150–165° C.

On cooling, the mixture which consisted of two layers, was poured into water, neutralized with an excess of dilute sodium hydroxide and extracted with ether. The ether extract was dried over sodium sulfate. On removal of the ether on the steam bath, 55.6 gms. of viscous yellow oil was obtanied as a residue. The latter contained no organic chorine and was evaluated as a pesticide without any further treatment.

EXAMPLE 2

N-(1-nonadecoxy-hydroxypropyl)ethylene diamine

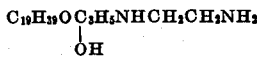

The above indicated amine was prepared in two steps as described below:

Step 1

A 3-way flask equipped with a stirrer, a return condenser, a dropping funnel, and a thermometer, was charged with 79.6 gms. of nonadecyl alcohol which had been prepared from $C_{18}$ polypropylene by the oxo reaction, that is by condensation of the hydrocarbon with a mixture of carbon monoxide and hydrogen in the presence of a catalyst, and by subsequently reducing the nonadecyl aldehydes thus formed, to the corresponding nonadecyl alcohol. To this was then added 3 ml. of a $BF_3$-ether complex.

The dropping funnel was charged with 23.1 gms. of epichlorhydrin. The latter was then added to the reactor slowly (over a period of 30 min.) with rapid stirring and sufficient cooling to keep the reaction temperature below 40° C. After all the epichlorhydrin had been added, the mixture was stirred for one hour at room temperature. On completion of the reaction, the product was poured into water, extracted with ether, washed with dilute sodium carbonate solution, and finally dried over sodium sulfate. On removal of the solvent on the steam bath, 101.5 gms. of a practically colorless viscous oil were obtained. This may be designated as product A.

Step 2

To obtain the desired amine, a 3-way flask fitted with a stirrer, a return condenser and a thermometer, was charged with 53.4 gms. of product A, and 24 gms. of ethylene diamine. The mixture was then heated with stirring for 1 hour at 130–140° C. The mixture was then poured into water, treated with a slight excess of sodium hydroxide and extracted with ether. The extract was dried over sodium sulfate and finally evaporated to dryness on the steam bath. The residue consisted of 52 gms. of yellow viscous oil. The product was then evaluated as an insecticide and fungicide.

EXAMPLE 3

N-(1-tertiaryoctylphenoxy-hydroxypropyl)ethylene diamine

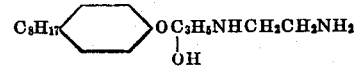

The above indicated amine, too, was prepared in two steps. The procedure is described below:

Step 1

A 3-way flask fitted with a stirrer, a return condenser, a dropping funnel, and a thermometer, was charged with 103 gms. (0.5 mol) of tertiary octylphenol and 200 ml. chloroform. To this was then added 5 ml. of ether $BF_3$ complex. The dropping funnel was charged with 46.3 gms. (0.5 mol) of epichlorhydrin. The epichlorhydrin was then added to the reactor slowly (over a period of 50 minutes) with stirring and sufficient cooling to keep the reaction temperature below 40° C. When all the epichlorhydrin had been added, the mixture was stirred for an additional 1½ hours at room temperature, whereupon it was poured into water and extracted with ether. The extract was washed with dilute sodium bicarbonate solution and dried over sodium sulfate. On removal of the solvent the reaction product was obtained as a viscous oil, weighing 138.7 gms., which may be designated as product B.

Step 2

A 3-way flask equipped with a stirrer, a return condenser, and a thermometer, was charged with 44.8 gms. (0.15 mol) of product B, and 30 gms. (0.5 mol) of anhydrous ethylene diamine. The mixture was then heated with stirring for one hour and forty minutes at 145°–150° C. The product was then poured into water, treated with 100 ml. of 10% sodium hydroxide, and extracted with ether. The extract was then dried over sodium sulfate. On removal of the solvent on the steam bath, the reaction product was obtained as a viscous yellow oil weighing 27.5 gms.

EXAMPLE 4

The compounds of Examples 1–3 were tested for parasiticidal activity and are listed in the table below.

The values given in column 1 represent the percent mortality of the test insects after 96 hours following a 2 minute immersion in a 0.25% aqueous solution or suspension of the test compound.

The results in column 2 are given as percent mortality after 96 hours following bloodstream injection of 0.002 cc. of a 5% solution of the test compound.

Results in column 3 represent the mortality resulting from placing 5 milligrams of test material per gram body weight on the fly's body (0.002 cc. of a 5 percent solution per fly).

The results in column 4 are based upon the Slide Germination technique for fungicidal testing as described by Wellman and McCallan (Contributions of Boyce Thompson Institute, vol. 13, No. 3, pages 171–176).

TABLE

| Compound | I Contact Insecticidal Activity (Per Cent Kill) | | II Bloodstream Insecticidal Activity (Per Cent Kill) | | III Housefly Toxicity, Nelson Drop | IV Fungicidal Inhibiting Conc. (Weight Per Cent) | |
|---|---|---|---|---|---|---|---|
| | Blattella germanica (German Roach) | Omelpeltus sociatus (Milkweed Bug) | Periplanitus americana (American Roach) | | | Alterneria Solani | Sclerotinia Fructicola |
| | | | Female | Male | | | |
| 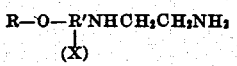 | 100 | 100 | 100 | 100 | 100 | 0.001 | 0.0001 |
| 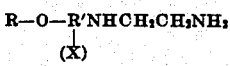 | 95 | 100 | 100 | 100 | 100 | 0.001 | 0.001 |
| 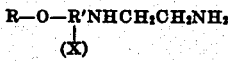 | 50 | 95 | 100 | 100 | 100 | 0.001 | 0.001 |

It is to be understood that the invention is not limited to the specific examples which have been offered merely as illustrations and that modification may be made within the scope of the appended claims without departing from the spirit of the invention.

What is claimed is:

1. As new chemicals, ethylene diamine condensation products having the general compositional formula

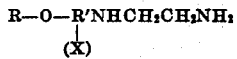

wherein R is a hydrocarbon radical having from 8 to 19 alkyl carbon atoms inclusive selected from the group consisting of alkyl and alkaryl radicals, R' is a radical selected from the group consisting of ethylene and propylene radicals and X is a radical selected from the group consisting of H and OH radicals.

2. As a new chemical, N-(tertiaryoctylphenoxy-ethyl) ethylenediamine.

3. As a new chemical, N-(1-tertiaryoctylphenoxy-hydroxypropyl) ethylene diamine.

4. As a new chemical, N-(1-nonadecoxy-hydroxypropyl) ethylene diamine.

5. A parasiticidal composition comprising an ethylene diamine condensation product having the general compositional formula

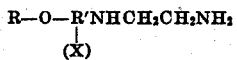

wherein R is a hydrocarbon radical having from 8 to 19 alkyl carbon atoms inclusive selected from the group consisting of alkyl and alkaryl radicals, R' is a radical selected from the group consisting of ethylene and propylene radicals and X is a radical selected from the group consisting of H and OH radicals, admixed with a solid diluent.

6. A parasiticidal dust composition comprising an ethylene diamine condensation product having the general compositional formula

R—O—R'NHCH₂CH₂NH₂
(X)

wherein R is a hydrocarbon radical having from 8 to 19 alkyl carbon atoms inclusive selected from the group consisting of alkyl and alkaryl radicals, R' is a radical selected from the group consisting of ethylene and propylene radicals, and X is a radical selected from the group consisting of H and OH radicals, admixed with a powdered clay.

7. A parasiticidal dust composition as in claim 6 in which the clay is bentonite.

8. A parasiticidal composition comprising an ethylene diamine condensation product having the general compositional formula,

R—O—R'NHCH₂CH₂NH₂
(X)

wherein R is a hydrocarbon radical having from 8 to 19 alkyl carbon atoms inclusive, selected from the group consisting of alkyl and alkaryl radicals, R' is a radical selected from the group consisting of ethylene and propylene radicals, and X is a radical selected from the group consisting of H and OH radicals, as an active ingredient and a solvent therefor.

9. A parasiticidal composition comprising an aqueous suspension of an ethylene diamine condensation product having the general compositional formula,

R—O—R'NHCH₂CH₂NH₂
(X)

wherein R is a hydrocarbon radical having from 8 to 19 alkyl carbon atoms inclusive, selected from the group consisting of alkyl and alkaryl radicals, R' is a radical selected from the group consisting of ethylene and propylene radicals, and X is a radical selected from the group consisting of H and OH radicals, as an active ingredient, said aqueous suspension containing a wetting agent.

HOWARD L. YOWELL.
LOUIS A. MIKESKA.

REFERENCES CITED

The following references are of record in the file of this patent:

UNITED STATES PATENTS

| Number | Name | Date |
|---|---|---|
| 2,113,606 | Taub et al. | Apr. 12, 1938 |
| 2,287,465 | Bock | June 23, 1942 |

FOREIGN PATENTS

| Number | Country | Date |
|---|---|---|
| 204,700 | Switzerland | May 15, 1939 |
| 204,701 | Switzerland | May 15, 1939 |